（12）United States Patent
Kelly et al.

(10) Patent No.: US 6,995,823 B1
(45) Date of Patent: Feb. 7, 2006

(54) VIEWING ANGLE FOR LIQUID CRYSTAL DISPLAY SYSTEM AND METHOD

(75) Inventors: Jack Kelly, Stow, OH (US); Marina Lavrentovich, Kent, OH (US); Shu Li, Fremont, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/208,591

(22) Filed: Jul. 30, 2002

(51) Int. Cl.
*G02F 1/1335* (2006.01)

(52) U.S. Cl. .................. 349/119; 349/117; 349/120
(58) Field of Classification Search ............... 349/117, 349/118, 119, 120, 121
See application file for complete search history.

(56) References Cited

U.S. PATENT DOCUMENTS

| | | | |
|---|---|---|---|
| 5,619,352 A * | 4/1997 | Koch et al. ............... 349/89 |
| 5,895,106 A * | 4/1999 | VanderPloeg et al. ...... 349/120 |
| 5,929,946 A * | 7/1999 | Sharp et al. ............... 349/18 |
| 5,978,055 A * | 11/1999 | Van De Witte et al. .... 349/119 |
| 5,990,997 A * | 11/1999 | Jones et al. ............... 349/120 |
| 6,034,756 A * | 3/2000 | Yuan et al. ............... 349/119 |
| 6,307,608 B1 * | 10/2001 | Sakamoto ............... 349/119 |
| 6,411,355 B1 * | 6/2002 | Manabe et al. ............ 349/120 |
| 2001/0030726 A1 * | 10/2001 | Yoshida et al. ........... 349/117 |

* cited by examiner

*Primary Examiner*—Dung T. Nguyen
*Assistant Examiner*—Michael H Caley
(74) *Attorney, Agent, or Firm*—Nathan O. Jensen; Kyle Eppele

(57) ABSTRACT

A display system is disclosed. The display system includes a light source and a display element illuminated by the light source. The display system also includes a first liquid crystal polymer compensation film layer that is disposed adjacent to the first side of the display element. The display also includes a second liquid crystal polymer compensation film layer disposed adjacent a second side of the display element. Further, the display system includes a third liquid crystal polymer compensation film layer that is disposed adjacent the second liquid crystal polymer compensation film layer.

6 Claims, 4 Drawing Sheets

310 COMPENSATION FILM MADE FROM NEGATIVE BIREFRINGENCE DISCOTIC MATERIAL ON TAC SUBSTRATE

320 HALF OF THE ACTIVATED TN CELL (AT 6V)

VIEWING ANGLE FOR LIQUID CRYSTAL DISPLAY SYSTEM AND METHOD

BACKGROUND

Active matrix liquid crystal displays (AMLCDs) are based on the twisted nematic (TN) effect. One drawback of conventional TN LCDs is that optical characteristics such as contrast and color saturation are strongly dependent on the direction of viewing. Because of this drawback, among others, the viewing angle width, i.e., the range of viewing directions, where contrast exceeds a given value may be rather limited.

Conventionally, various technologies have been developed to widen the viewing angle. A wide viewing angle technology which is generally applied in small and medium LCDs uses two individual discotic compensation films which are produced by Fuji Film; the two individual discotic compensation film layers are disposed on opposing sides of an AMLCD element. The discotic compensation films are made of disc like liquid crystal molecules, which are tilted with respect to the film plane. Conventionally, the two compensation films are used between the front polarizer and the front substrate of the liquid crystal display element and between the rear polarizer and the rear substrate of the liquid crystal display element.

This conventional structure may act to improve the field of view; however, it may still be inadequate for certain applications, such as but not limited to micro LCDs, used in near-to-the-eye applications or projection displays. Further, this conventional structure may provide for improved contrast but only in an asymmetric manner over the field of view. For example, good contrast can be achieved only in one direction (typically horizontal direction). In other directions, the high contrast may be possible, but only in a narrow region.

Accordingly, there is a need for display systems utilizing discotic compensation films to improve the viewing angle performance of micro-liquid crystal displays and any other types of liquid crystal displays.

There is also a need for display systems using multiple liquid crystal films positioned on one side of the display element to achieve high contrast ratio in a wide and symmetrical viewing angle.

Further, there is a need for display systems using multiple discotic films on each side of the LCD panel that can further improve the viewing angle in the vertical direction, while maintaining good contrast in the horizontal direction.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a display system. The display system includes a light source. The display system also includes a display element illuminated by the light source. Further, the display system includes a first liquid crystal polymer compensation film layer disposed adjacent a first side of the display element. Further still, the display system includes a second liquid crystal polymer compensation film layer disposed adjacent a second side of the display element. Yet further still, the display system includes a third liquid crystal polymer compensation film layer disposed adjacent the second liquid crystal polymer compensation film layer.

Another example of the invention relates to a liquid crystal display system. The liquid crystal display system includes a light source. The liquid crystal display system also includes a liquid crystal display element illuminated by the light source. The liquid crystal display element has a first side and a second side. The liquid crystal display system also includes a polarizer layer disposed adjacent the first side of the display element. Further still, the liquid crystal display system includes a first discotic compensation film layer disposed adjacent the second side of the display element. Yet further still, the liquid crystal display system includes a second discotic compensation film layer disposed adjacent the second side of the display element.

Yet another example of the invention relates to a method of forming a liquid crystal display system. The method includes providing a liquid crystal display element having a first side and a second side. The method also includes providing a first liquid crystal polymer compensation film layer adjacent the first side. Further, the method includes providing a second liquid crystal polymer compensation film layer adjacent the second side. Further still, the method includes providing a third liquid crystal polymer compensation film layer adjacent the second side.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
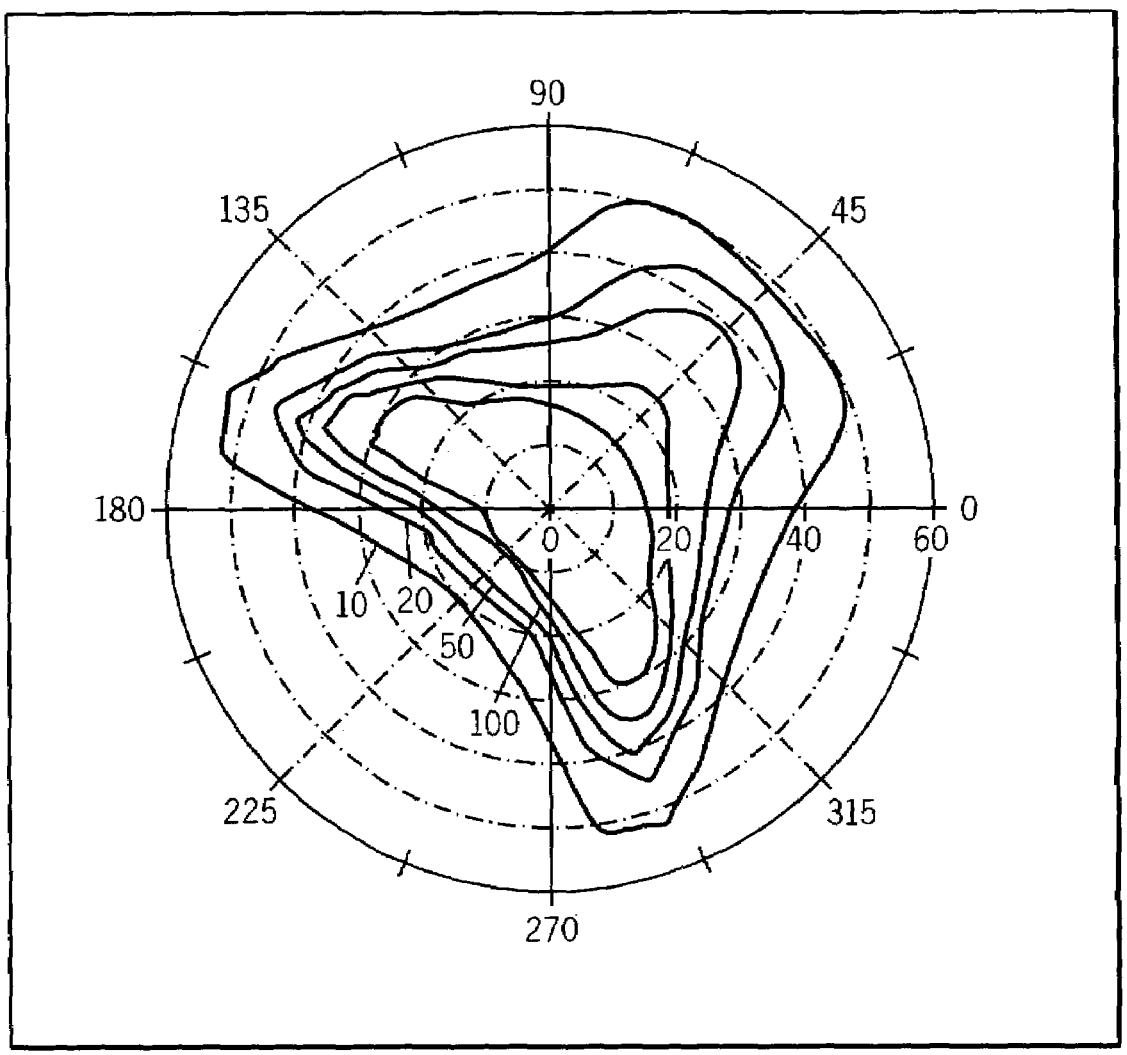
FIG. 1 is an exemplary depiction of the contrast ratio of a conventional AMLCD relative to viewing angle.
Figure 2A:
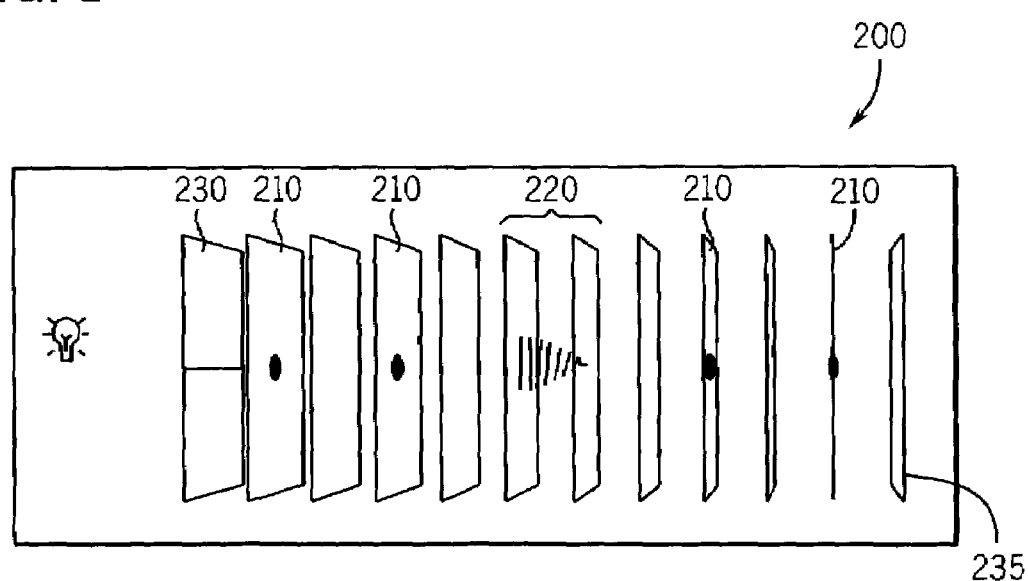
FIG. 2A is an exemplary depiction of a display system using two pairs of discotic film disposed on opposing sides of an LC element.
Figure 2B:
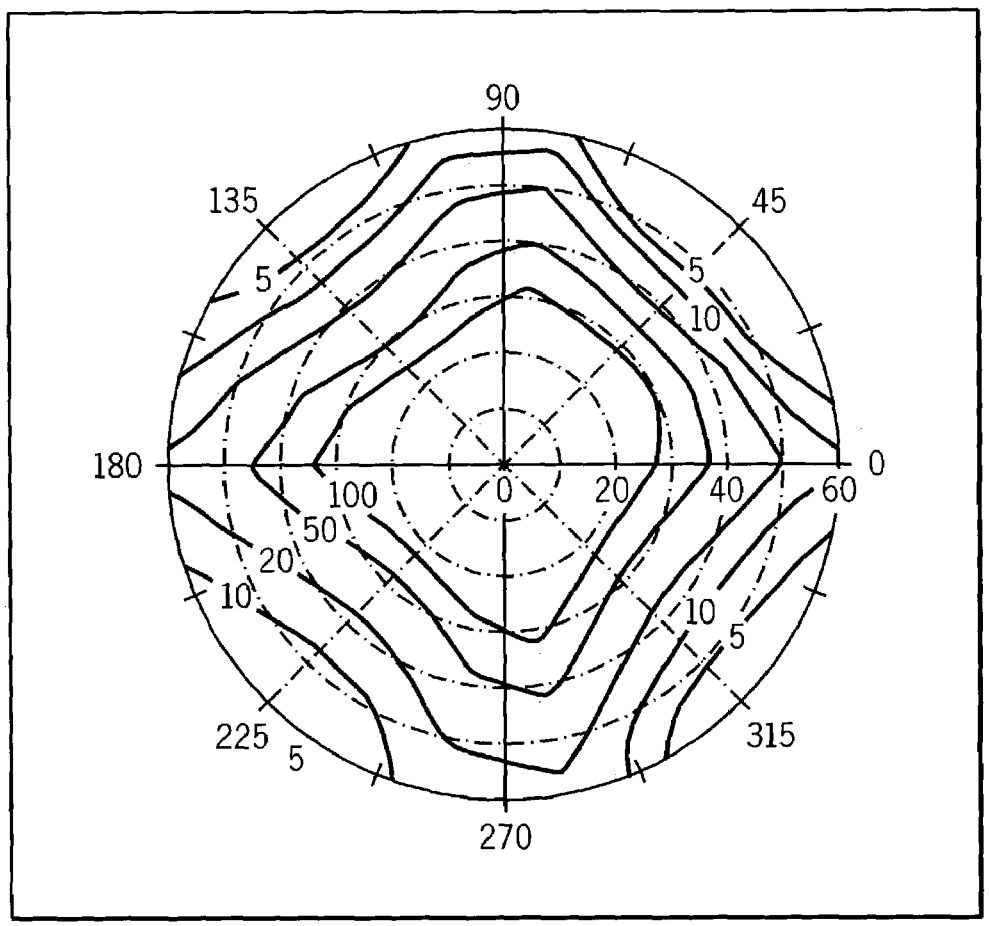
FIG. 2B is an exemplary depiction of an iso-contrast plot for a display using the configuration of FIG. 2A.

Conventional microdisplays as well as other types of liquid crystal displays may have a narrow and asymmetric viewing cone, as depicted in FIG. 1. To improve the optical characteristics of such displays, various types and configurations of commercially available retardation films may be used. In an exemplary embodiment (FIG. 2A), a display system 200 is depicted having two pairs of crossed Fuji films 210 placed on both sides of LC cell 220 between the cell and polarizers 230 and 235. In this case the contrast ratio exceeds 100:1 for all viewing direction at polar angles higher than 25° as depicted in exemplary FIG. 2B. In alternative embodiments, different liquid crystal polymer films and film configurations that provide desirable properties, such as but not limited to a symmetric viewing cone and contrast ratio 80:1 at all the viewing directions for polar angles of 20° may be achieved by employing Nippon films and two pairs of crossed positive A-plates placed between Nippon films and polarizers, e.g. Further, in accordance with the invention, any number of layers of liquid crystal compensation film may be applied to any one side of the TN cell and alternatively to both sides of the TN cell. Devices of the prior art have not recognized the contrast advantages of providing multiple layers of liquid crystal polymer compensation film on at least one side of a TN cell.

Figure 3:
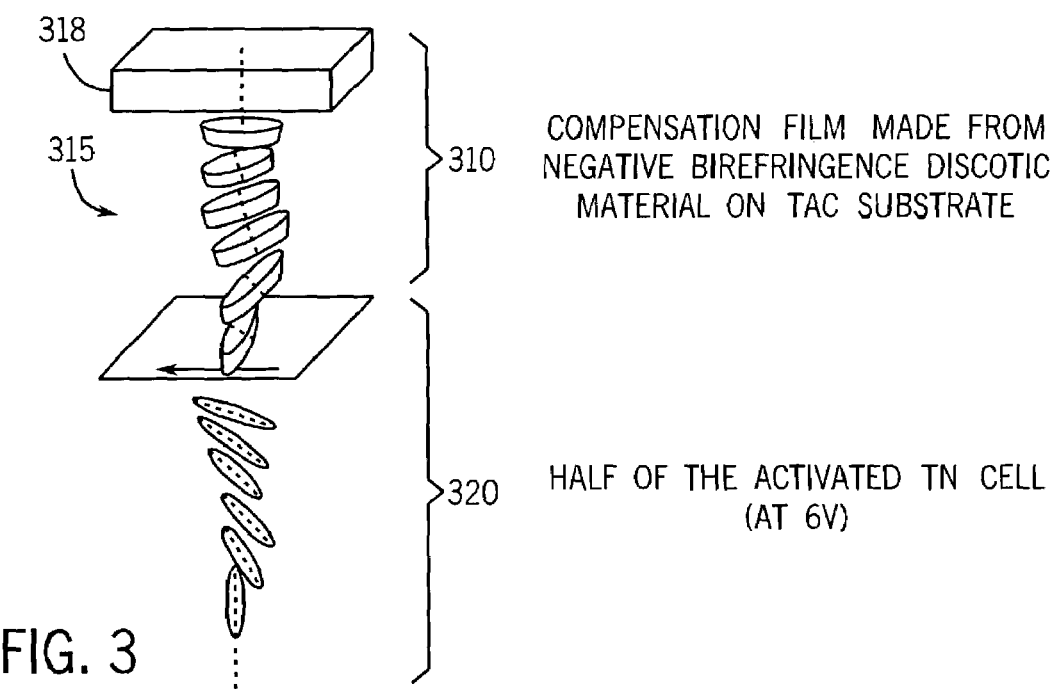
FIG. 3 is an exemplary depiction of a Fuji compensation film configuration with half of an activated TN cell.

A variety of types of liquid crystal polymer compensation films are commercially available and are applicable to the disclosed display systems for improving contrast over a wide viewing angle. In an exemplary embodiment, LC polymer compensation film is produced by Fuji Films Co., among others. The Fuji film was designed from discotic LC that forms a layer with splay configuration deposited on a TAC (C-plate) substrate that possess negative birefringence and has an optic axis that is perpendicular to the film surface. FIG. 3, for example, shows the configuration of Fuji film 310 and a half of LC cell 320 compensated with the film. The Fuji film includes a discotic splay layer 318 and a TAC substrate 318.

Figure 4:
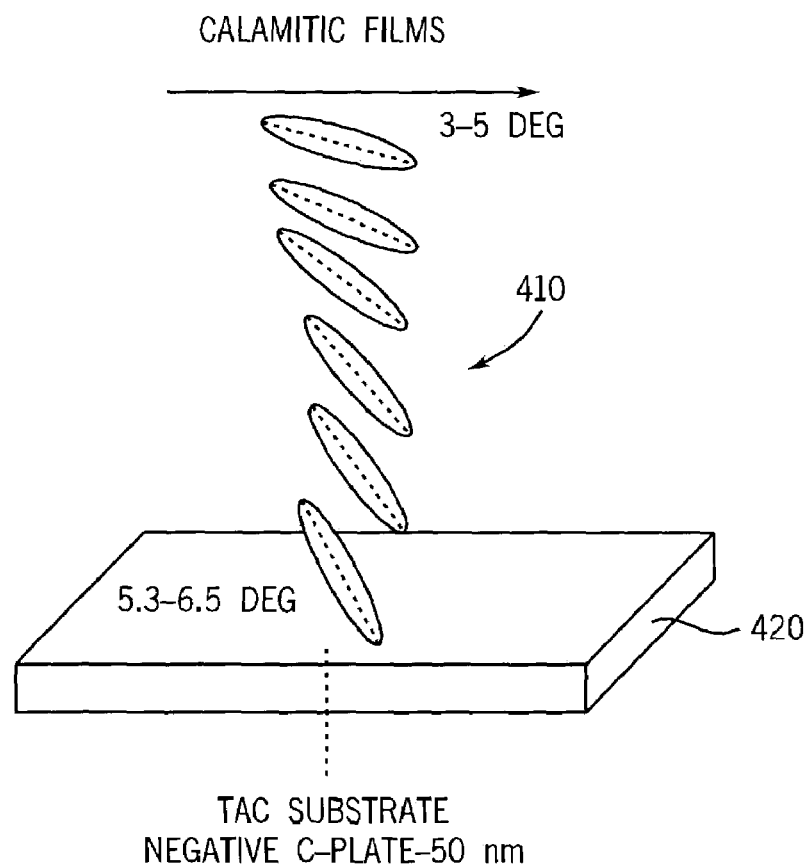
FIG. 4 is an exemplary embodiment of the structure of a Nippon film.

An alternative exemplary type of birefringence film used for TN display compensation is Nippon film 400 with the structure presented in FIG. 4. The film contains an LC splay layer 410 similar to discotic layer 315 of the Fuji film; however, being made of rod-like (calamitic) LC molecules, it possesses positive birefringence. Nippon film 400 also includes TAC substrate 420.

Other types of films which may be applied include, but are not limited to, positive uniaxial films with optic axis in the plane of the film and variable retardation (positive A-plate). These films are easy to manufacture and already available from some film manufacturers. Further, it may be desirable to use negative A-plates, negative and positive C-plates, and biaxial films.

Figure 5:
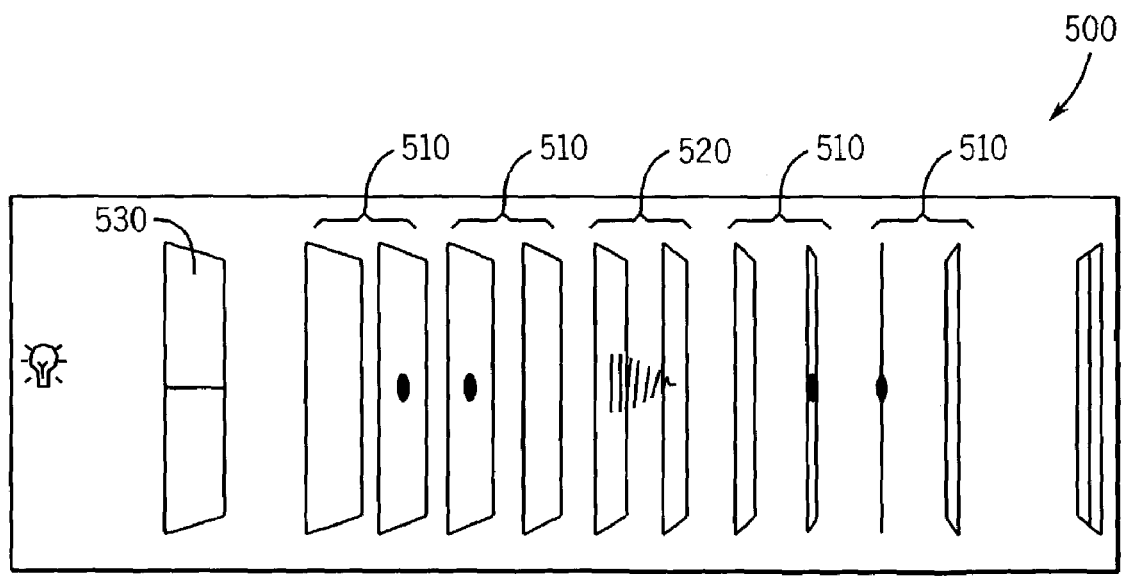
FIG. 5 is an exemplary depiction of a display system including two Fuji film layers on each side of a TN cell.

Referring now to FIG. 5, a display system 500 is depicted including Fuji films 510 mounted adjacent the two sides of a TN cell 520. The pairs of Fuji films 510 have crossed tilt directions on each cell side. In an exemplary embodiment, one Fuji film may be mounted on a polarizer 530 with an adhesive layer stuck to polarizer 530 and tilt direction parallel to the rubbing direction on the opposite TN cell side. The second film in the pair should be adhered to the cell with the tilt direction parallel to the rubbing direction on the adjacent substrate. Thus, the configuration features four Fuji film layers 510.

Figure 6:
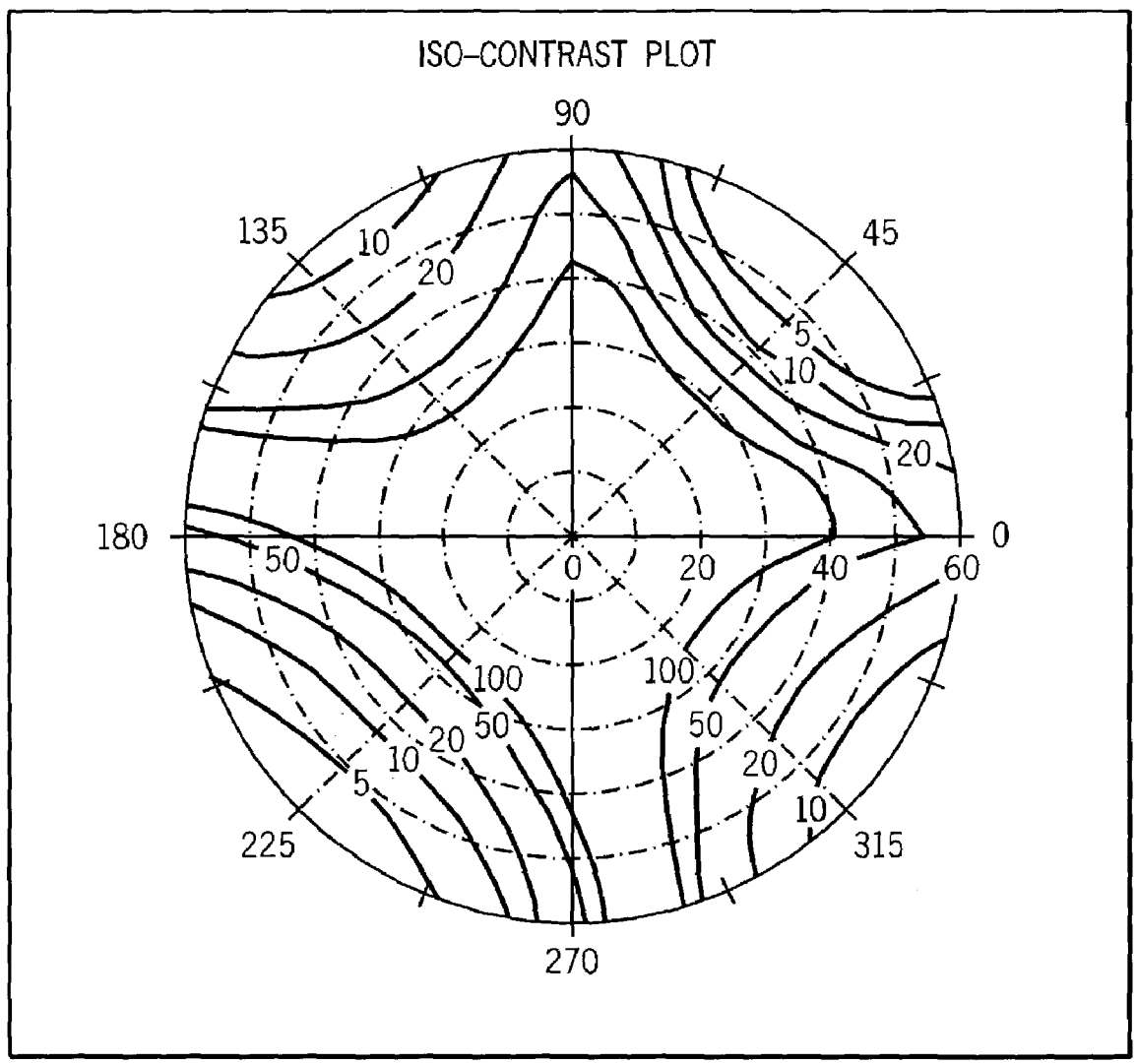
FIG. 6 is an exemplary depiction of an iso-contrast plot associated with the configuration of FIG. 5.

FIG. 6 depicts exemplary optical characteristics of the display of FIG. 5. This device has contrast higher than 100:1 at approximately 250 for all directions. Devices of the prior art, having only a single layer of liquid crystal polymer compensation film disposed on one or both sides of the TN cell, conventionally are unable to achieve such contrast ratios in all directions.

In an alternative embodiment, the Fuji films may be parallel to each other and have their tilt axes in the same directions and may be aligned along the rubbing direction of the adjacent cell substrate. These display configurations may display uniform gray scale without inversion for conventional left, right and up directions at the polar angles up to 30°. Further, they are easy to manufacture and, thus, may be more preferable over other configurations.

In an alternative exemplary embodiment, microdisplays may be compensated with Nippon films. Such compensation schemes provide wider and more symmetric viewing cones than the Fuji film configurations. The applications of additional uniaxial retarders may be used to improve the viewing cone even better.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The display configurations shown and described may differ depending on the chosen performance characteristics and physical characteristics of the display. For example, the number and/or ordering of layers used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A liquid crystal display system, comprising:
   a light source;
   a liquid crystal display element illuminated by the light source, the liquid crystal display element having a first side and a second side;
   a first polarizing layer disposed on the first side of the display element;
   a first negative birefingent discotic liquid crystal polymer compensation film layer disposed on the second side of the display element having a first average tilt direction;
   a second negative birefringent discotic liquid crystal polymer compensation film layer disposed on the second side of the display element having the first average tilt direction;
   a third discotic compensation film layer disposed on the first side of the display element having a second average tilt direction crossed with the first average tilt direction; and
   a fourth discotic compensation film layer disposed on the first side of the display element having the second average tilt direction.

2. The display system of claim 1, further comprising:
   a second polarizing layer disposed adjacent the first discotic compensation film layer.

3. The display system of claim 2, wherein:
   the first polarizing layer is disposed adjacent the third discotic compensation film layer.

4. The display system of claim 1, wherein the liquid crystal display element includes a silicon on insulator (SOI) active matrix.

5. The display system of claim 1, wherein the liquid crystal display element includes at least one of an amorphous and a polycrystalline silicon active matrix.

6. The display system of claim 1, wherein the display element includes an active matrix liquid crystal display (AMLCD) element.

* * * * *